United States Patent
Asai et al.

(10) Patent No.: US 9,545,736 B2
(45) Date of Patent: Jan. 17, 2017

(54) MOLD AND DIE METALLIC MATERIAL, AIR-PERMEABLE MEMBER FOR MOLD AND DIE USE, AND METHOD FOR MANUFACTURING THE SAME

(75) Inventors: Masayuki Asai, Toyokawa (JP); Mineo Suzuki, Toyokawa (JP); Tetsu Yabuno, Toyokawa (JP)

(73) Assignee: SINTOKOGIO, LTD., Aichi (JP)

( * ) Notice: Subject to any disclaimer, the term of this patent is extended or adjusted under 35 U.S.C. 154(b) by 485 days.

(21) Appl. No.: 13/985,231

(22) PCT Filed: Feb. 13, 2012

(86) PCT No.: PCT/JP2012/053894
§ 371 (c)(1),
(2), (4) Date: Aug. 13, 2013

(87) PCT Pub. No.: WO2012/111835
PCT Pub. Date: Aug. 23, 2012

(65) Prior Publication Data
US 2013/0313405 A1    Nov. 28, 2013

(30) Foreign Application Priority Data

Feb. 14, 2011    (JP) .................. 2011-028067

(51) Int. Cl.
*B29C 33/38*    (2006.01)
*B22F 3/11*    (2006.01)
(Continued)

(52) U.S. Cl.
CPC ....... *B29C 33/3814* (2013.01); *B22D 17/2209* (2013.01); *B22F 3/11* (2013.01);
(Continued)

(58) Field of Classification Search
CPC ......... B29C 33/3814; B22F 3/11; B22F 5/007; B22F 3/24; C22C 47/14; C22C 49/08; B22D 17/2209
See application file for complete search history.

(56) References Cited

U.S. PATENT DOCUMENTS 2,122,053 A * 6/1938 Burkhardt ............. B22F 3/1121
    210/510.1
2,217,802 A * 10/1940 Koehring ................. B22F 3/10
    106/38.27
(Continued)

FOREIGN PATENT DOCUMENTS

CN    1101315 A    4/1995
CN    1153688 A    7/1997
(Continued)

OTHER PUBLICATIONS

He Yuexian, "Breathable, Durable Precision Mold Development," Special Casting & Nonferrous Alloys, and English language abstract thereof, *China Academic Journal Electronic Publishing House*, 1985, pp. 36 and 50.
(Continued)

*Primary Examiner* — Alison L Hindenlang
*Assistant Examiner* — Emmanuel S Luk
(74) *Attorney, Agent, or Firm* — Brinks Gilson & Lione

(57) ABSTRACT

A mold and die metallic material, an air-permeable member for mold and die use, and a method for making the same are provided. The mold and die metallic material is made by forming a mixed material containing stainless steel fibers with an equivalent diameter of 30-300 μm and a length of 0.4-5.0 mm, and stainless steel powder, heat sintering a green body of the mixed material, and heating the sintered body thus obtained in a nitrogen atmosphere and nitrided; wherein average open pore diameter thereof is 3-50 μm.

15 Claims, 4 Drawing Sheets

(51) Int. Cl.
*B22F 3/24* (2006.01)
*B22F 5/00* (2006.01)
*C22C 49/08* (2006.01)
*B22D 17/22* (2006.01)
*C22C 47/14* (2006.01)

(52) U.S. Cl.
CPC ............... *B22F 3/24* (2013.01); *B22F 5/007* (2013.01); *C22C 47/14* (2013.01); *C22C 49/08* (2013.01)

(56) References Cited

U.S. PATENT DOCUMENTS

| | | | | |
|---|---|---|---|---|
| 2,835,572 A * | 5/1958 | Isbenjian | ................... | B22F 3/11 419/2 |
| 3,915,699 A * | 10/1975 | Umehara | ................ | B22C 9/061 419/17 |
| 4,314,399 A * | 2/1982 | Severinsson | .......... | B22F 3/1283 419/5 |
| 4,340,474 A * | 7/1982 | Johnston | ................ | B01D 45/04 210/199 |
| 4,373,127 A * | 2/1983 | Haskett | ................... | B22F 5/007 219/119 |
| 4,469,654 A * | 9/1984 | Haskett | ................... | B22F 5/007 264/105 |
| 4,531,705 A * | 7/1985 | Nakagawa | .............. | B22C 9/061 249/134 |
| 4,631,228 A * | 12/1986 | Kruger | ................... | B22F 1/0003 264/123 |
| 4,872,888 A * | 10/1989 | Ehrfeld | .............. | B01D 67/0058 210/500.35 |
| 5,152,828 A * | 10/1992 | Katoh | ........................ | B22C 1/00 419/2 |
| 5,322,657 A * | 6/1994 | Hirzel | ................ | B01D 39/2037 264/115 |
| 5,375,996 A * | 12/1994 | Nakamura | .............. | F23D 14/12 126/39 J |
| 5,405,570 A * | 4/1995 | Fuma | ..................... | B22C 9/061 419/2 |
| 5,435,967 A | 7/1995 | Nishikawa et al. | | |
| 5,625,861 A * | 4/1997 | Nishi | ................ | B01D 39/2034 419/2 |
| 5,775,402 A * | 7/1998 | Sachs | ..................... | B22C 9/065 164/4.1 |
| 5,841,041 A | 11/1998 | Asano et al. | | |
| 5,850,590 A * | 12/1998 | Furuta | ....................... | B22F 3/15 419/2 |
| 5,989,492 A * | 11/1999 | Larsson | ................... | B22F 3/22 264/328.2 |
| 6,066,274 A * | 5/2000 | Antonson | .............. | A61C 13/20 264/16 |
| 6,592,807 B2 * | 7/2003 | Tuttle | .................... | B22F 3/1283 419/2 |
| 2006/0141093 A1* | 6/2006 | Leu | ...................... | C04B 35/5626 425/161 |
| 2006/0150684 A1* | 7/2006 | Leu | .......................... | B22F 5/007 65/170 |
| 2008/0081007 A1* | 4/2008 | Steele | ................ | B01D 39/2034 422/179 |
| 2009/0140459 A1* | 6/2009 | Nilsson | .............. | B01D 39/2044 264/309 |
| 2010/0297462 A1* | 11/2010 | Lapszynski | ......... | A61F 2/30771 428/548 |
| 2013/0313405 A1* | 11/2013 | Asai | ......................... | B22F 3/11 249/175 |

FOREIGN PATENT DOCUMENTS

| | | |
|---|---|---|
| CN | 1907642 A | 2/2007 |
| EP | 0 764 485 A2 | 3/1997 |
| JP | 3-28303 A | 2/1991 |
| JP | 3-188203 A | 8/1991 |
| JP | 03-239509 A | 10/1991 |
| JP | 04-072004 A | 3/1992 |
| JP | 06-033112 A | 2/1994 |
| JP | 07-108348 A | 4/1995 |
| JP | 07-113103 A | 5/1995 |
| JP | H 8-150437 A | 6/1996 |
| JP | 9-85389 A | 3/1997 |
| JP | 9-225580 A | 9/1997 |

OTHER PUBLICATIONS

International Search Report for International Application No. PCT/JP2012/053894, dated Feb. 20, 2013, 3 pages.

\* cited by examiner

MOLD AND DIE METALLIC MATERIAL, AIR-PERMEABLE MEMBER FOR MOLD AND DIE USE, AND METHOD FOR MANUFACTURING THE SAME

This application is a 371 application of PCT/JP2012/053894 having an international filing date of Feb. 13, 2012, which claims priority to JP2011-028067 filed Feb. 14, 2011, the entire contents of which are incorporated herein by reference.

TECHNICAL FIELD

The present invention relates to a mold and die metallic material for use in a mold and die and the like, an air-permeable member for mold and die using the mold and die metallic material, and a method for manufacturing a mold and die metallic material and an air-permeable member for mold and die use.

BACKGROUND ART

Conventional permeable durable molds for use in vacuum forming methods are disclosed, for example, in JP-A-07-108348 (and counterpart CN1041178C and U.S. Pat. No. 5,405,570A thereof) (Patent Document 1). A method for manufacturing a permeable molded body used in vacuum forming methods is disclosed, for example, in JP-A-07-113103 (and counterparts CN1102607A and U.S. Pat. No. 5,435,967A thereof) (Patent Document 2).

SUMMARY OF THE INVENTION

Technical Problems

The conventional permeable durable mold disclosed in Patent Document 1 has a problem of low strength; in addition, although vacuum forming by pouring was possible, these molds could not be used for injection molding, since the molds do not permit mechanical machining, EDM, or etching. In the molded body disclosed in Patent Document 1, there is a further problem of poor strength.

A mold and die metallic material with permeability and high strength, and also suitable for use in injection molding, has therefore been sought. Additionally, a solution with good machinability has been sought in order to improve the ease of use of mold and die metallic materials.

It is therefore an object of the present invention to provide a mold and die metallic material having strength and machinability in addition to permeability.

It is another object of the present invention to provide an air-permeable member for mold and die use using the mold and die metallic material, and a method for manufacturing the mold and die metallic material and the air-permeable member for mold and die use.

Solution to Problems

The above object is achieved according to the present invention by providing a mold and die metallic material made by forming a mixed material containing stainless steel fibers with an equivalent diameter of 30-300 μm and a length of 0.4-5.0 mm, and stainless steel powder, heat sintering a green body of the mixed material, and heating the sintered body thus obtained in a nitrogen atmosphere and nitrided; wherein average open pore diameter thereof is 3-50 μm.

A mold and die metallic material thus constituted enables superior permeability while maintaining strength, thus making it applicable to injection molding.

In the mold and die metallic material according to the present invention, the stainless steel fibers and stainless steel powder are preferably ferritic stainless.

The present invention thus constituted is advantageous from the standpoint of easy machinability and corrosion resistance in comparison with austenitic stainless, martensitic stainless, and the like.

In the mold and die metallic material according to the present invention, the nitrogen content resulting from nitriding is preferably 0.3-1.2 wt. % per 100 wt. % stainless component.

The present invention thus constituted results in the requisite appropriate hardness as a mold and die metallic material, with superior machinability.

In the mold and die metallic material according to the present invention, the mixed material further preferably contains copper powder or copper-tin alloy powder.

Using the present invention thus constituted, toughness is improved and a superior mold and die metallic material is obtained.

In the mold and die metallic material according to the present invention, the mixed material preferably contains 20-80 wt. % stainless steel fiber and 20-80 wt. % stainless steel powder as stainless component, as well as 1-10 wt. % copper powder or copper-tin alloy powder per 100 wt. % stainless component.

The mold and die metallic material according to the present invention has porosity 15-35% of the open pore.

In the mold and die metallic material according to the present invention, nitriding is preferably carried out by holding the material in nitrogen gas or decomposed ammonia gas at 900-1050° C.

An air-permeable member for mold and die use according to the present invention is obtained by EDM, etching, or machining of the mold and die metallic material described above, and the air-permeable member for mold and die use is assembled into a mold.

Using the air-permeable member for mold and die use according to the present invention thus constituted, degassing properties and resin fluidity of the air-permeable member for mold and die use can be improved, mold structures can be simplified, products formerly difficult to form by injection molding can be formed, the molding cycle shortened, and gas defects prevented. In other words, reticulate and lattice-shaped molded parts can be reliably molded, and thin pieces can also be well molded. In addition, because of the high adhesion of resin to the mold, surface patterns can be faithfully molded and luster unevenness removed, so that painting can be omitted.

The air-permeable member for mold and die use according to the present invention is obtained by imparting patterns by EDM, etching, or machining of the mold and die metallic material, wherein molds into which the air-permeable member for mold and die use are assembled may be used for injection molding of resin.

An air-permeable member for mold and die use is obtained by EDM, etching, or machining of the mold and die metallic material, wherein conducting holes for passing water are formed in the interior of the air-permeable member for mold and die use.

In the present invention thus constituted, conducting holes for passing water are formed on the interior of the air-permeable member for mold and die use, therefore the mold temperature can be held constant, permitting a stable quality and molding cycle to be obtained.

In the air-permeable member for mold and die use according to the present invention, sealing by a hardening agent added epoxy resin is preferably applied to the inside surface of the conducting holes in the air-permeable member for mold and die use.

In the present invention thus constituted, sealing is accomplished using a hardening agent added epoxy resin on the inside surface of the conducting holes in the air-permeable member for mold use, therefore water leakage from the conducting holes can be reliably prevented.

An air-permeable member for mold and die use according to the present invention is preferably obtained by EDM, etching, or machining of the mold and die metallic material, wherein post-machining machine oil or etching fluid penetrating holes is cleaned out by air blowing.

In the present invention thus constituted, machine oil or etching fluid penetrating the open pores of the air-permeable member for mold and die use as the result of EDM, etching, or machining is cleaned out by air blowing, thereby eliminating the necessity for performing complex procedures or providing special equipment as in the past, and enabling safe, reliable cleaning of machine oil and the like.

In the air-permeable member for mold and die use according to the present invention, air permeability through a cleaned air-permeable member for mold and die use is preferably 50 $cm^3/cm^2 \cdot sec$ or greater.

The air-permeable member for mold and die use according to the present invention is obtained by machining of the mold and die metallic material, wherein the surface roughness of the machined portion is 3 μm-20 μm.

In the air-permeable member for mold and die use according to the present invention, the surface roughness of the machined portion is preferably 3.2 μm-13.5 μm.

In the air-permeable member for mold and die use according to the present invention, machining is preferably performed by a ball end mill, and the ball end mill rotates at 3000-30000 rpm, at a feed speed of 1000-2000 mm/min.

A method for making a mold and die metallic material according to the present invention comprises the steps of: forming a mixed material containing stainless steel fiber with an equivalent diameter of 30-300 μm and a length of 0.4-5.0 mm stainless steel powder; heat sintering a green body of the mixed material; and heating the sintered body thus obtained in a nitrogen atmosphere and nitrided; wherein the average hole diameter of open pores of the mold and die metallic material is 3-50 μm.

A method for making an air-permeable member for mold and die use according to the present invention comprises the steps of forming a mixed material containing stainless steel fibers with an equivalent diameter of 30-300 μm and a length of 0.4-5.0 mm and stainless steel powder; heat sintering a green body of the mixed material; and heating the sintered body thus obtained in a nitrogen atmosphere and nitrided to make a mold and die metallic material with an average open pore diameter of 3-50 μm; making an air-permeable member for mold and die use made by EDM, etching, or machining of the mold and die metallic material; forming conducting holes for passing water on interior of the air-permeable member for mold and die use; and performing sealing of the inside surface of the conducting holes by using a hardening agent added epoxy resin.

A method for making an air-permeable member for mold and die use according to the present invention comprises the steps of: forming a mixed material containing stainless steel fibers with an equivalent diameter of 30-300 μm and a length of 0.4-5.0 mm and stainless steel powder; heat sintering a green body of the mixed material; heating the sintered body thus obtained in a nitrogen atmosphere and nitrided to make a mold and die metallic material with an average open pore diameter of 3-50 μm; making an air-permeable member for mold and die use by EDM, etching, or mechanical machining of the mold and die metallic material; and cleaning, by air blowing, machine oil or etching fluid penetrating the open pores after machining.

A method for making an air-permeable member for mold and die use according to the present invention comprises the steps of: forming a mixed material containing stainless steel fibers with an equivalent diameter of 30-300 μm and a length of 0.4-5.0 mm and stainless steel powder; heat sintering a green body of the mixed material; heating the sintered body thus obtained in a nitrogen atmosphere and nitrided to make a mold and die metallic material with an average open pore diameter of 3-50 μm; and machining the mold and die metallic material so that the surface roughness in the machined portion is 3 μm-20 μm.

In the method of making the air-permeable member for mold and die use according to the present invention, the step of machining is performed by a ball end mill and the ball end mill rotates at 3000-30000 rpm, at a feed speed of 1000-2000 mm/min.

DETAILED DESCRIPTION OF THE PREFERRED EMBODIMENTS

Referring to the attached drawings, a mold and die metallic material, an air-permeable member for mold and die use, and a method for manufacturing the mold and die metallic material and the air-permeable member for mold and die use according to an embodiment of the present invention is explained.

Figure 1:
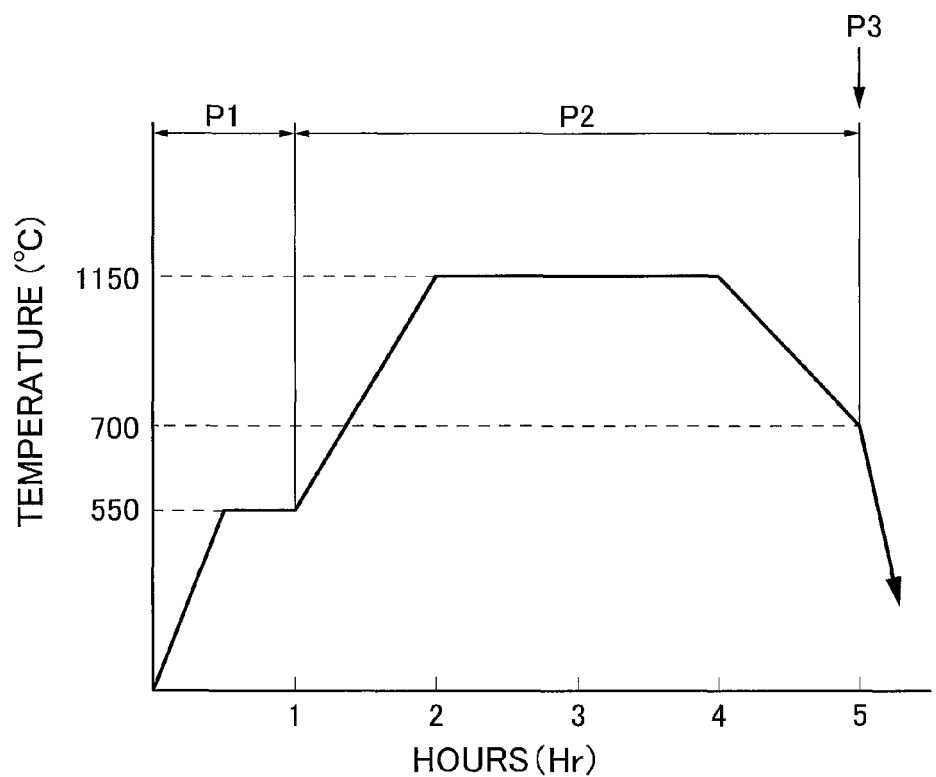
FIG. 1 is a diagram showing sintering conditions for a mixed material green body when manufacturing a mold and die metallic material according to an embodiment of the present invention.
Figure 2:
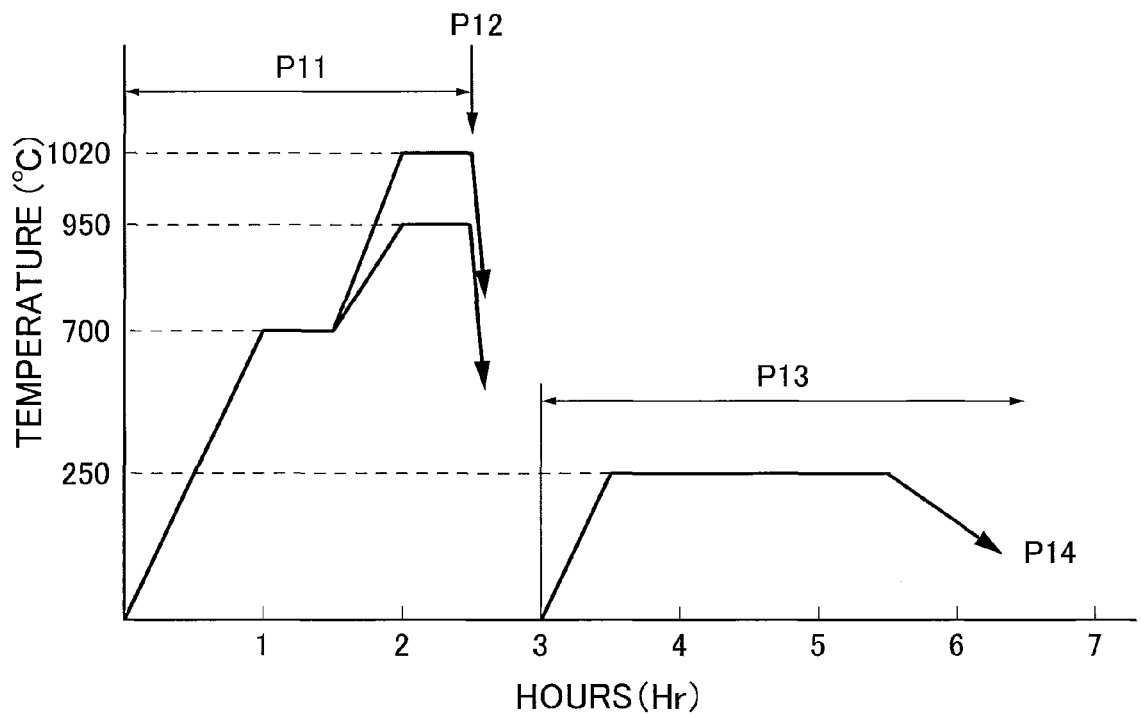
FIG. 2 is a diagram showing mold and die metallic material vacuum hardening conditions when manufacturing a mold and die metallic material according to an embodiment of the present invention.

First, referring to FIGS. 1 and 2, the mold and die metallic material of an embodiment of the present invention, and the method for manufacturing the same are explained.

In the mold and die metallic material of an embodiment of the present invention, a green body is obtained by pressure-forming a mixed material containing ferritic stainless steel fibers with an equivalent diameter of 30-300 μm and a length of 0.4-5.0 mm, and ferritic stainless steel powder; the green body thus obtained is heat sintered, and the sintered body thus obtained is heated in a nitrogen atmosphere and nitrided to obtain a mold and die metallic material. In addition, the average pore diameter in the mold and die metallic material is 3-50 μm.

The mold and die metallic material of the embodiment of the present invention is not limited to ferritic stainless, and may also utilize, for example, austenitic stainless, martensitic stainless, or the like. In some cases, however, machining of austenitic stainless is difficult and, depending on composition, martensitic stainless may be subject to rust as its corrosion resistance degrades. Therefore compared to austenitic stainless or martensitic stainless, ferritic stainless is advantageous from the standpoint of ease of machinability and corrosion resistance.

A mixed material containing ferritic stainless steel fiber and ferritic stainless steel powder may also include copper power or copper-tin alloy powder; in such cases toughness is improved by characteristics of the copper alloy, and a superior mold and die metallic material is obtained.

Note that it is preferable for the mixed material to contain 20-80 wt. % stainless steel fiber and 20-80 wt. % stainless steel powder as stainless component, as well as 1-10 wt. % copper powder or copper-tin alloy powder per 100 wt. % stainless component.

A typical example of the ferritic stainless used as a stainless steel fiber and stainless steel powder is SUS434 (C≤0.1%; 16%≤Cr≤19%; 0.5%≤Mo≤2%) or SUS430 (C≤0.03%; 16%≤Cr≤19%).

Stainless steel fibers are prepared as follows: 30-300 μm thick coil material made, for example, of the above-described chemical components, is cut by an end surface cutting method to prepare long fibers with an equivalent diameter of 30-300 μm; short fibers of length 0.4-5.0 mm are obtained by chopping the long fibers using a cutter mill or the like, and the short fibers are used.

"30-300 μm equivalent diameter stainless steel fibers" here refers to stainless steel fibers for which the diameter of a circle equal in cross sectional area to the cross sectional area of those stainless steel fibers is in a range of 30-300 μm.

A mixed material is obtained by adding together the above-described stainless steel fiber, stainless steel powder, and copper (Cu) powder or copper-tin (Cu—Sn) alloy powder; the mixed material is uniformly filled into a CIP-method rubber mold and pressure formed under a pressure force of 2-4 tons/cm² to form a green body of the mixed material.

The green body is heat sintered in a vacuum atmosphere, and the sintered body thus obtained is then held at 900° C.-1050° C. in nitrogen gas or decomposed ammonia gas, thereby nitriding so as to result in a 0.3-1.2 wt. % nitrogen content per 100 wt. % of the stainless component (stainless steel fiber and stainless steel powder) serving as a base metal.

The forming, sintering, and nitriding described above provides for a mold and die metallic material having fine holes over its entire surface (porosity 15-35%; average diameter 3-50 μm), with the strength and hardness (HMV 250-500) required for a mold material, without loss of cutting characteristics or corrosion resistance. Such a mold and die metallic material also enables hardness to be controlled through the application of heat treatment.

Note that in the above-described embodiment, the mold and die metallic material is obtained by forming, sintering, and nitriding, but the present invention is not limited thereto. i.e., cooling and reheating may also be carried out after nitriding. Reheating is performed, for example, by vacuum hardening. Also, good results were obtained when cooling was done by rapid cooling down to 250° C. or below at an average cooling speed of 5.5° C./min or greater, and reheating was performed in a range, for example, of 600-680° C.

Next, Examples 1 through 6 of a mold and die metallic material according to the embodiment of the present invention, as well as Comparative Examples 1 through 4 for comparison with the Examples are explained.

First the conditions for the Examples and Comparative Examples are explained. For the stainless steel fiber, 100 μm coils of SUS434 (C: 0.1%, Cr: 18%, Mo: 1%) stainless steel were cut using an end surface cutting method to prepare long fibers with an equivalent diameter of 60-150 μm; these were then chopped in a cutter mill into short fibers of 0.4-5.0 mm, which were used.

A SUS434 (C: 0.05%, Cr: 17%, Mo: 2%) stainless steel powder was used as the stainless steel powder. A condition for the stainless steel powder was that 90% or more be of 150 μm or smaller diameter.

An electrolytic copper powder was used for the copper powder. A condition for the copper powder was that 80% or more be of 45 μm or smaller diameter.

40 wt. % stainless steel fiber and 60 wt. % stainless steel powder were mixed as the mixed material; 3 wt. % copper powder were then further added per 100 wt. % of this stainless component to obtain a mixed material. A green body (green compact) was obtained by uniformly filling this mixed material into a CIP method rubber mold and pressure forming at a pressure force of 3 ton/cm². Next, a sintered body was obtained by sintering the green body under the sintering conditions shown in FIG. 1.

FIG. 1 is a diagram showing sintering conditions for a mixed material green body when manufacturing a mold material for mold use according to an embodiment of the present invention. The horizontal axis in FIG. 1 indicates hours (Hr), while the vertical axis indicates temperature (° C.); the range shown by P1 is a vacuum of $1 \times 10^{-2}$ torr or below; the range shown by P2 is for partial nitrogen at 10 torr; and time P3 is the time at which 3 kg/cm² of nitrogen gas is introduced.

Details of the sintering conditions shown in FIG. 1 are explained. A 250 mm×200 mm×100 mm (approximately 30 kg) block-shaped piece was used as sample material. First, pressure on the sample was reduced to $1 \times 10^{-2}$ torr or less in a vacuum sintering furnace; thereafter the temperature was raised to 550° C.; the temperature of 550° C. was then maintained for 30 minutes to fully degas the vaporizing components, and a vacuum of $1 \times 10^{-2}$ torr or below was obtained. The temperature was then again raised, up to 1150° C., where it was held for 2 hours, following which the furnace was cooled down to 700° C.

10 torr (10/780 atmospheres) nitrogen is introduced when the temperature has been elevated to 1150° C. The purpose of introducing nitrogen is to prevent vaporization of Cr in the stainless steel while holding at a high temperature in a vacuum.

3 kg/cm² nitrogen gas is introduced when the furnace is cooled to 700° C., and the sample is then rapidly cooled. The reason for starting the rapid cooling at 700° C. is to avoid passing the transformation point and causing micro structural change.

The sample was then nitrided under the conditions shown in FIG. 1. FIG. 1 shows the analytic values and measured hardness values for components of the mold and die metallic material thus obtained.

TABLE 1

| | NITRIDING CONDITIONS | | | ANALYTIC VALUES (%) | | | |
|---|---|---|---|---|---|---|---|
| | TEMPERATURE (° C.) | HOURS | NITROGEN (atm) | [C] | [N] | [O] | HARDNESS (HMV) |
| COMPARATIVE EXAMPLE 1 | — | — | — | 0.04 | 0.006 | 0.14 | 181 |
| COMPARATIVE EXAMPLE 2 | 850 | 1 Hr | 1 | 0.04 | 0.29 | 0.19 | 235 |
| EXAMPLE 1 | 900 | 1 Hr | 1 | 0.04 | 0.44 | 0.13 | 274 |
| EXAMPLE 2 | 950 | 1 Hr | 1 | 0.04 | 0.95 | 0.16 | 421 |
| EXAMPLE 3 | 1000 | 1 Hr | 1 | 0.03 | 1.20 | 0.12 | 472 |
| COMPARATIVE EXAMPLE 3 | 1050 | 1 Hr | 1 | 0.03 | 1.37 | 0.18 | 506 |
| EXAMPLE 4 | 1000 | 15 min | 1 | 0.04 | 0.52 | 0.19 | 291 |
| EXAMPLE 5 | 1000 | 30 min | 1 | 0.04 | 0.61 | 0.17 | 304 |
| EXAMPLE 6 | 1000 | 45 min | 1 | 0.03 | 0.80 | 0.15 | 384 |
| COMPARATIVE EXAMPLE 4 | 1000 | 2 Hr | 1 | 0.03 | 1.41 | 0.17 | 508 |

First, pressure on the sample was reduced to $1\times10^{-2}$ torr or less in a vacuum sintering furnace; thereafter the temperature was raised to 700° C.; next a temperature of 700° C. was maintained for 30 minutes to fully degas the vaporizing component, and a vacuum of $1\times10^{-2}$ torr or below was obtained. Thereafter the temperature was again raised, each held temperature or hold time was varied, and nitriding was carried out in a nitrogen atmosphere at 1 atmosphere of pressure. 30 minutes or more hold time was required to obtain a uniform nitrogen content.

As shown in FIG. 1, hardness was less than the HMV250 hardness required as a mold and die metallic material in the un-nitrided sample (Comparative Example 1) and in the sample with a nitrogen content of less than 0.3% (Comparative Example 2), making these unsuitable. For those samples (Comparative Examples 3, 4) in which nitrogen content was greater than 1.2%, a large amount of chrome nitride was produced; hardness was HMV500 or greater, and machinability was poor, making them unsuitable as mold and die metallic material. "HMV" here refers to microvickers hardness—a unit for indicating hardness; these values were measured using a Shimadzu Corp. microvickers hardness meter.

Next hardness, pores, and the like are explained. Of the Examples in Table 1, Example 1 was selected; Table 2 shows mechanical properties and pore diameter and porosity results for Example 1. Here Example 1 is superior in machinability, and cutting speed is equal to conventional standard mold and die metallic material (SKD61).

TABLE 2

| BENDING STRENGTH (kg/mm$^2$) | TENSILE STRENGTH (kg/mm$^2$) | DENSITY (g/mm$^2$) | AVERAGE PORE DIAMETER (μ) | POROSITY (%) |
|---|---|---|---|---|
| 52.7 | 34.9 | 6.1 | 7.2 | 20.8 |

The mold and die metallic material of Example 1 was machined and used as a mold. General purpose ABS resin with a minimum thickness of 0.7 mm and product dimensions of 10 mm×150 mm in a band shape was inserted at 10 locations and a molding test conducted; clean moldings free of burn mark were obtained at an injection pressure of 98 kg/cm$^2$. Note that when standard mold and die metallic material was used, injection pressure was 138 kg/cm$^2$.

Next a vacuum hardening test is explained. Of the Examples in Table 1, Examples 2 and 5 were selected; Table 3 shows the results of the vacuum hardening test.

TABLE 3

| | HOLDING TEMPERATURE (° C.) | HARDNESS (HMV) | TENSILE STRENGTH (kg/mm$^2$) | AVERAGE PORE DIAMETER (μ) | POROSITY (%) |
|---|---|---|---|---|---|
| EXAMPLE 2 | 950 | 524 | 53.9 | 7 | 19.7 |
| | 1020 | 617 | 64.7 | 7 | 18.6 |
| EXAMPLE 5 | 950 | 498 | 47.8 | 7 | 20.2 |
| | 1020 | 600 | 62.2 | 7 | 19.2 |

Here, referring to FIG. 2, vacuum hardening conditions are explained. FIG. 2 is a diagram showing conditions for vacuum hardening when manufacturing a mold and die metallic material according to the embodiment of the present invention. The horizontal axis of FIG. 2 indicates hours (Hr), while the vertical axis indicates temperature (° C.); the range shown by P11 and P13 indicates the range in which the vacuum was about $1\times10^{-2}$ torr; P12 indicates the time at which 3 kg/cm$^2$ of nitrogen gas was introduced, and P14 indicates that the oven was cooled.

As shown in FIG. 2, there was first a reduction in pressure within the vacuum heating furnace to about $1\times10^{-2}$ torr; thereafter the temperature rose to 700° C., where it was held for 30 minutes to fully degas the vaporizing component; next, after attaining a vacuum level of approximately $1\times10^{-2}$ torr, the temperature was raised respectively to 950° C. and 1020° C.; the temperatures were maintained for 30 minutes, at which point nitrogen gas was introduced at 3 kg/cm$^2$ and the sample was rapidly cooled. A vacuum of approximately $1\times10^{-2}$ torr was further attained 30 minutes later, following which the temperature rose to 250° C., where it was held for 2 hours, following which the furnace was cooled.

The vacuum hardening conditions described above were the same as the conditions used for hardening a general mold and die metallic material, and it was confirmed that a hardness up to HMV600 was obtained even under normal vacuum heat treatment conditions, making this material fully usable for glass fiber-reinforced resins, as well.

The mold and die metallic material of the above-described embodiment of the present invention is capable of overcoming the various problems caused by oxidative corrosion when ferritic stainless steel is used as primary material, and since the material is nitrided, its hardness can be controlled by subsequently performed hardening; the material has superior characteristics as a mold and die metallic material.

That is, the mold and die metallic material has fine vent pores over its entire surface, as well as superior cutting characteristics and corrosion-resistance. This mold and die metallic material is also suitable not only for machining, but also for EDM, etching, etc. Such a mold and die metallic material also enables hardness to be controlled through the application of heat treatment.

As described above, the mold and die metallic material according to the embodiment of the present invention has enabled superior permeability while maintaining strength, making the material usable for injection molding. The mold and die metallic material according to the embodiment of the present invention can also be used for injection molding, and can further simplify the structure of the mold and die metallic material, as a result, can improve degassing properties and resin fluidity, and form the products without defects. That is, the mode and die metallic material can form products formerly difficult to injection mold, reduce injection molding pressures, shorten molding cycles, and prevent gas defects. Further, the mold and die metallic material can also be used for stamping forming and press forming.

Next an air-permeable member for mold and die use and a method of manufacturing the same according to an embodiment of the present invention are explained.

The mold and die metallic material described above can be used as an air-permeable member for mold and die use in EDM, etching, or machining, and the air-permeable member for mold and die use can be built into the mold. Also, the mold and die metallic material described above can be used as an air-permeable member for mold and die use by imparting a pattern using EDM, etching, or machining, and a mold into which the air-permeable member for mold and die use is built is used for injection molding.

Next an example of fabricating an air-permeable member for mold and die use by EDM of a mold material for mold and die use is explained. A mold for resin injection molding of an automobile interior cup holder base was fabricated using an air-permeable member (a mold and die metallic material) with the specifications shown in Table 2 for a cavity-type insert.

When machining an air-permeable member for mold and die use, machining of the shape is first performed by machining, then a copper electrode is prepared; machining is done to achieve surface roughness machining conditions of approximately Rmax20 μm using Sodick Co., Ltd. equipment (the EPOC-3), following which machine oil remaining in the pores of the air-permeable member is removed, thus fabricating the injection molding mold.

ABS resin was formed using the mold and the gloss value of the molded part surface, measured (using a Shiro Co., Ltd. gloss meter), and found to have a gloss value of 4.0. The glossiness of molded parts made with molds of standard mold steel was high, at about 10. In general, a low glossiness value for a resin molded part indicated a delustered state, in which external appearance and tactile sensation were improved. In automobiles, resin molded parts with appropriately low glossiness are preferred for automobile interiors, and molded resin parts with an extremely good finish were obtained using the present air-permeable member.

Next an example of fabricating an air-permeable member for mold and die use by etching a mold material for mold and die use. As with EDM, a mold for resin injection molding of a cup holder base was fabricated using an air-permeable member (a mold and die metallic material of Example 1) with the specifications shown in Table 2 for a cavity-type insert.

In machining the air-permeable member for mold and die use, shaping is first performed by machining; next, sealing is done using sealing resin (sold by Koike Sanso Kogyo, Ltd.; trade name: Dichtol) so that etching fluid does not penetrate into the pores in the mold and die metallic material; next, a pattern is imparted by etching a typical leather grain pattern used for automobile interiors (processing by Tanazawa Hakkosha, Ltd.), and the Dichtol remaining in the pores of the air-permeable member for mold and die use is removed to fabricate a mold for injection molding.

Polypropylene resin was formed using this mold, and the molded part surface was measured (using a Shiro Co., Ltd. gloss meter) and found to have a gloss value of 2.0. The glossiness of molded parts made with molds of standard mold steel is high, at about 5.5. In general, a low glossiness value for a resin molded part indicates a delustered state, in which external appearance and tactile sensation are improved. In automobiles, resin molded parts with appropriately low glossiness are preferred for automobile interiors, and molded resin parts with an extremely good finish were obtained using the air-permeable member for mold and die use according to the embodiment of the present invention.

Next a first and second usage example, in which an air-permeable member for mold and die use obtained from mold and die metallic material was used for resin molding, is explained.

As a first usage example, an example of eliminating short shots is explained. In the molding of a polypropylene resin speaker grill for an automobile interior, lines with a diameter of approximately 0.3 mm in a lattice with 1.5 mm openings can be normally formed, so that a part which until now had been a metal net can be manufactured by one piece resin molding.

As a second usage example, an example of eliminating a weld line is explained. When molding an ABS resin toilet seat, cross-shaped or T-shaped weld lines formerly occurred due to trapping in the mold of gas in the gap when molding, but by using the air-permeable mold member at the location of this weld line, we were able to resolve the occurrence of weld lines.

As explained above, the air-permeable member for mold and die use according to the embodiment of the present invention enables superior air permeability to be established while maintaining strength, making it also usable for injection molding. By using the mold material for mold and die use as a mold, degassing properties and resin fluidity can be improved, mold structures can be simplified, products formerly difficult to injection mold can be formed, injection molding pressures reduced, the molding cycle shortened, and gas defects prevented. In other words, reticulate and lattice-shaped molded parts can be reliably molded, as can thin pieces. And because of the high adhesion of resin to the mold, surface patterns can be faithfully molded and luster unevenness removed, so that painting can be omitted.

Figure 3:
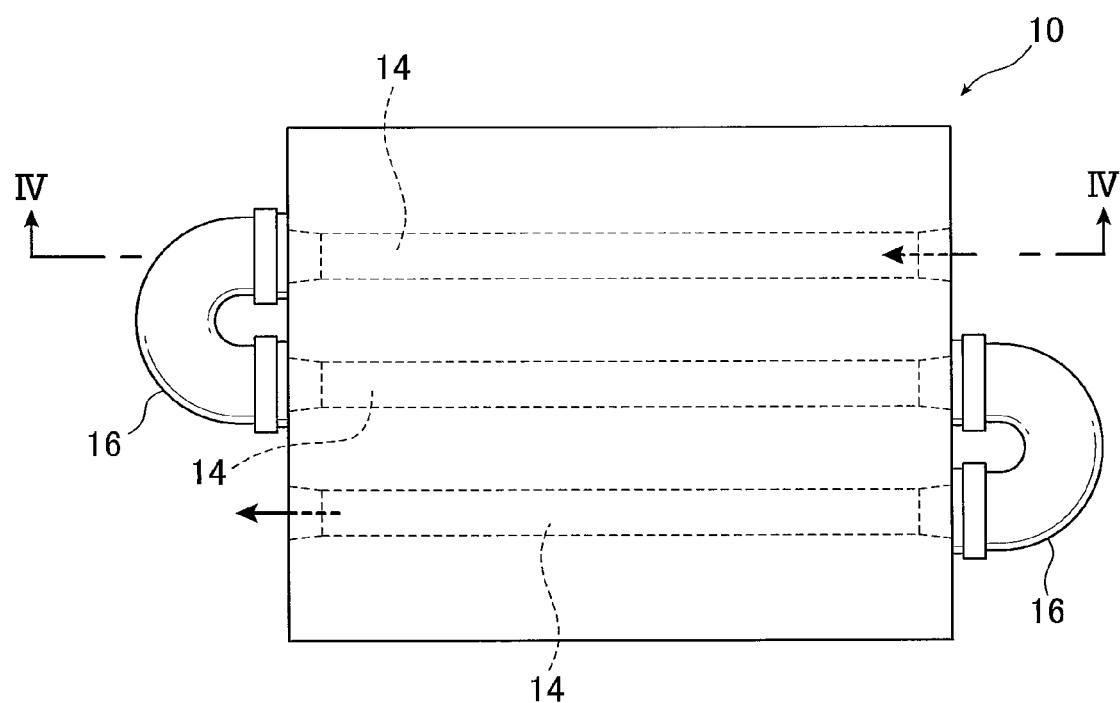
FIG. 3 is a partial plan view showing an air-permeable member for mold and die use according to another embodiment of the present invention.
Figure 4:
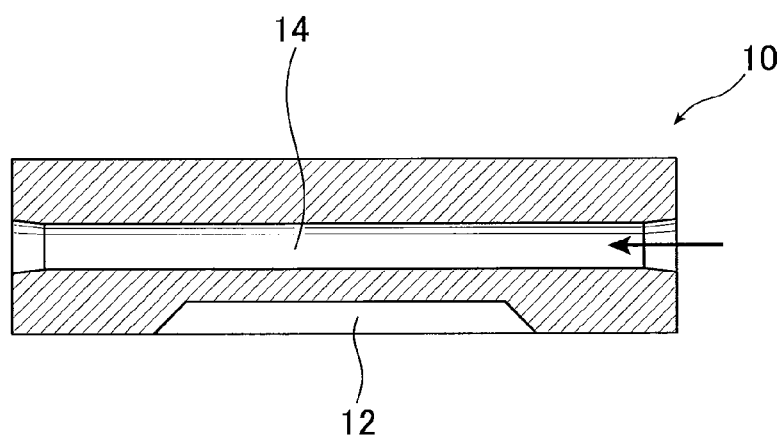
FIG. 4 is a cross sectional view seen along line IV-IV in FIG. 3.
Figure 5:
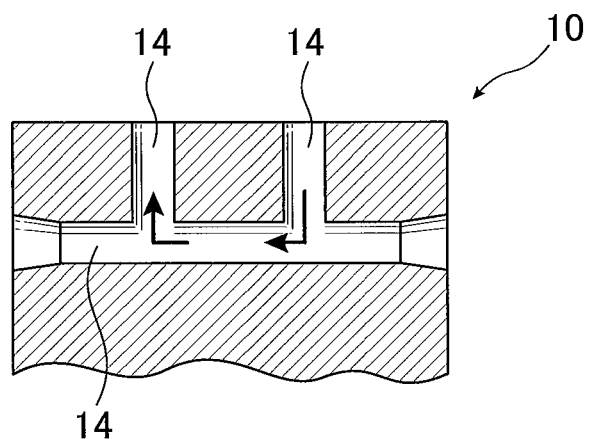
FIG. 5 is a partial cross sectional view showing another example of the air-permeable member for mold and die use in another embodiment of the present invention.
Figure 6:
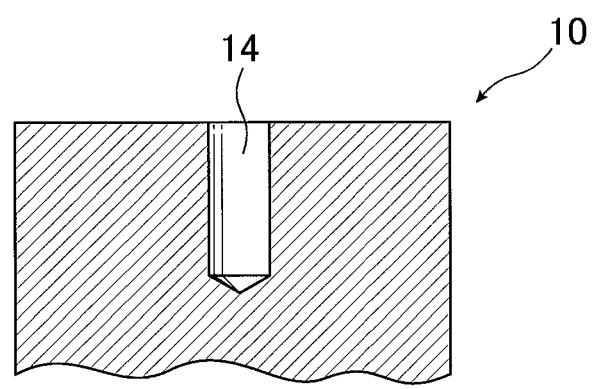
FIG. 6 is a partial cross sectional view showing still another example of the air-permeable member for mold and die use in another embodiment of the present invention.

Next, referring to FIGS. 3 through 6, the air-permeable member for mold and die use and method of manufacturing the same according to another embodiment of the present invention is explained. FIG. 3 is a partial plan view showing an air-permeable member for mold and die use according to another embodiment of the present invention; FIG. 4 is a cross sectional view taken along line IV-IV in FIG. 3; FIG. 5 is a partial cross sectional view showing another example of the air-permeable member for mold and die use according to another embodiment of the present invention; FIG. 6 is a partial cross sectional view showing still another example of an air-permeable member for mold and die use according to another embodiment of the present invention.

As shown in FIGS. 3 and 4, an air-permeable member for mold and die use 10 according to another embodiment of the present invention has a cavity 12 corresponding on one surface to the shape of the product; furthermore, multiple conducting holes 14 for passing water are formed on the interior thereof. These conducting holes 14 are formed in a straight line; both end portions of the conducting holes 14 are connected to the connecting pipe 16, and cooling water supplied from outside is caused to flow inside these conducting holes 14 and connecting pipe 16.

In addition to the straight line form shown in FIGS. 3 and 4, conducting holes 14 may be formed, as shown in FIG. 5, to form a circuit inside the air-permeable member for mold and die use 10. The conducting holes 14 may also have a tank shape, as shown in FIG. 6.

These conducting holes 14 are formed by drilling. A range of 5-20 mm is the preferred diameter for the conducting holes 14.

The following advantages proceed from forming the water conducting holes 14 in this manner on the interior of the air-permeable member for mold and die use 10. In injection molding typified by resin molding, heated molten resin is normally injected into a cooled mold, where it is cooled by the mold and solidified, thereby completing the injection molding. In such injection molding, the molding cycle is a few seconds or less for molded parts of a few grams, and even large molded parts such as automobile bumpers are formed in cycles of a few seconds. The conducting holes 14 are formed on the interior of the air-permeable member for mold and die use 10 of the embodiment of the present invention, and a fixed temperature is maintained by passing cooling water through these conducting holes 14, thus enabling a stable quality and molding cycle to be achieved.

Next the process of sealing to prevent leakage of water from the water conducting holes 14 formed on the interior of the air-permeable member for mold use 10 is explained. When conducting holes 14 are formed on the air-permeable member for mold and die use 10 by drilling, it may occur that if water is passed through the holes as is, that water can penetrate into the vent pores in the air-permeable member for mold and die use 10 causing water leakage, thereby destabilizing the injection molding and degrading molded part quality.

To prevent such water leakage, the inner surfaces of the conducting holes 14 in the air-permeable member for mold and die use 10 of the embodiment of the present invention are sealed using a hardening agent added epoxy resin. This hardening agent added epoxy resin is an epoxy resin in which hardening is started at room temperature by a hardening agent. Sealing is accomplished by first injecting the hardening agent added epoxy resin from conducting hole injection openings; this is then left standing still for several minutes, following which the epoxy resin is ejected; the assembly is then further left for a certain period of time until the resin remaining in the interior of the conducting holes has hardened, thereby completing the seal. Specifically, it is preferable to inject and then eject a hardening agent added epoxy resin with a viscosity of 200 mPa·s-2000 mPa·s after forming the conducting holes 14.

More specifically, sealing is implemented under the following conditions: epoxy resin initial viscosity: 500 mPa·s, mold temperature: 15° C.-25° C., quiescent time: 1-5 minutes, epoxy resin viscosity upon ejection: 1800-2500 mPa·s, left for 16 hrs or more at 15° C.-25° C. In samples sealed in this manner, it was confirmed that no water leakage occurred in a 0.6 mPa pressure leakage test.

Figure 7:
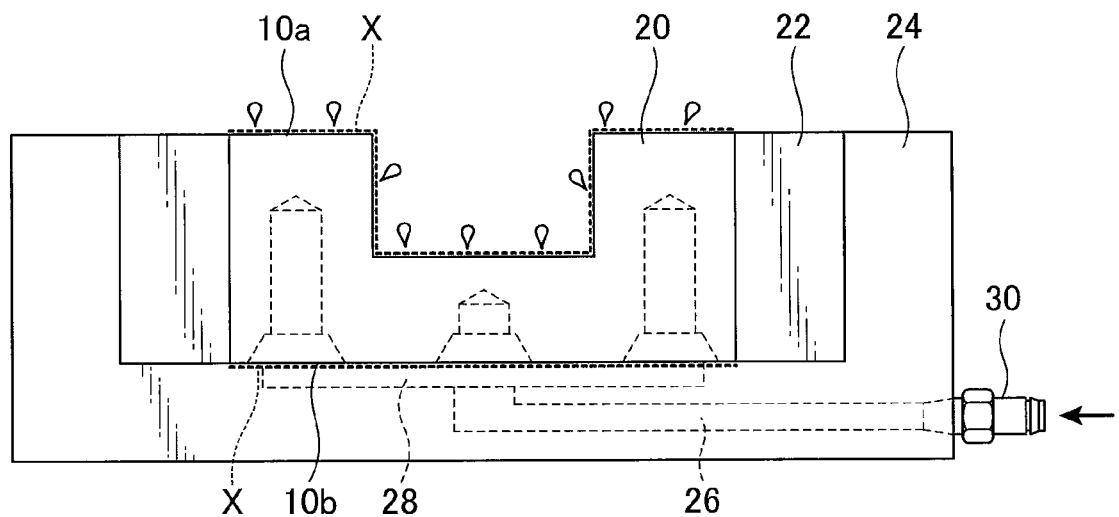
FIG. 7 is a front elevational view of an air-permeable member for mold and die use explaining air blow washing of an air-permeable member for mold and die use according to an embodiment of the present invention.
Figure 8:
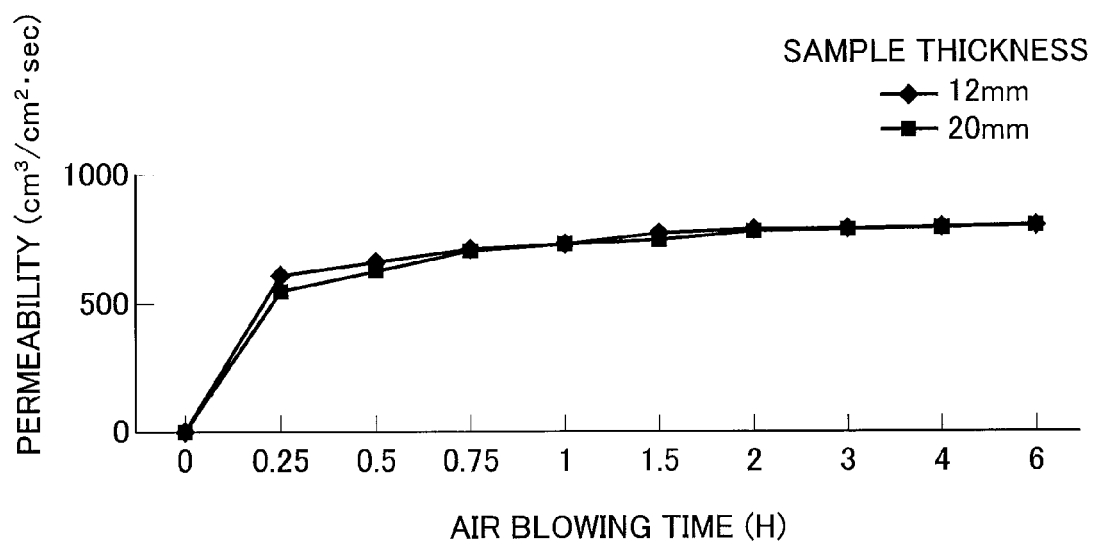
FIG. 8 is a diagram showing the relationship between air permeability and air blowing time in the air blow washing of an air-permeable member for mold and die use according to an embodiment of the present invention.

Next, referring to FIGS. 7 and 8, air blow cleaning of an air-permeable member for mold and die use. FIG. 7 is a front elevational view of an air-permeable member for mold and die use, explaining the air blow washing of the air-permeable member for mold and die use of the embodiment of the present invention; FIG. 8 is a diagram showing the relationship between air permeability and air blowing time in air blow washing.

In injection molding, molded parts are formed by replacing air inside a cavity with resin. In such injection molding, the air-permeable member for mold and die use according to the embodiment of the present invention is used on the cavity surface of the mold, and air in the cavity is vented using open pores in the air-permeable member for mold and die use. As described above, EDM, etching, or machining are performed to obtain a mold air permeable member, but these forms of machining can cause machine oil or etching fluid to penetrate the pores which serve as open pores, and this machine oil can cause loss of air permeability so that no gas venting effect is achieved, and molded part quality is reduced.

Therefore in the air-permeable member for mold and die use of the embodiment of the present invention, machine oil or etching fluid which has penetrated into open pores due to EDM, etching, or machining is cleaned out by air blowing.

As shown in FIG. 7, an air-permeable member for mold and die 20 is disposed inside a mold base 24 via an insert 22. An air supply/exhaust hole 26 is formed on this mold base 24, and an air connecting channel 28 is formed on the air-permeable member for mold and die use 20 side of the air supply/exhaust hole 26. A hose joint 30 is connected to the other end of the air supply/exhaust hole 26.

As preparation when air blowing, machining is done to assure permeability on the shape-machining surface 10a and reverse side 10b of the air-permeable member for molds 20, so that machine oil and the like penetrating the open pores after machining, and gas generated at the time of injection molding, can be reliably removed. I.e., machining is done so that air permeability is 50 cm$^3$/cm$^2$·sec or greater. This machining makes use of EDM, ball end mill machining, or the like.

After completing these pre-preparations, the air-permeable member for mold and die use 20 is disposed on the mold base 24 as shown in FIG. 7 and compressed air is supplied in this state to the air supply/exhaust hole 26 from the hose joint 30. Air compressed to 0.2-0.8 MPa is preferred as the supplied air; this air is uniformly conveyed by the air connecting channel 28, and air blowing is implemented.

More specifically, this air blow cleaning was accomplished by implementing EDM on the top and bottom surfaces (the shape-machining surface and reverse surface) of an air-permeable member for mold and die use with 20 μm average open pores, using two samples of differing thickness into which the machine oil had penetrated. 0.5 MPa compressed air was supplied and the relationship between air blow cleaning time and permeability was measured. Permeability here refers to the value measured with an integrating flowmeter of the flow volume per cm$^2$ of 0.5 MPa compressed air flowing for one second through the sample.

As shown in FIG. 8, it was confirmed for the air-permeable member for mold and die use 20 of the embodiment of the present invention that there was no change in air permeability after 6 hours of air blow cleaning, and most of the machine oil had been removed. The effectiveness of oil removal by air blowing was thus confirmed. Air permeability of a 20 mm thick sample 2 hours after starting air blow cleaning was 770 cm$^3$/cm$^2$·sec; permeability of 95% or higher was attained after 6 hours, so it is effective to perform air blowing for 2 hours or more.

In the air-permeable member for mold and die use of the embodiment of the present invention, machine oil or etching fluid penetrating the vent holes of the air-permeable member for mold and die use as the result of EDM, etching, or machining is cleaned out by air blowing, thereby eliminating the necessity for performing complex procedures or providing special equipment as in the past, and enabling safe, reliable cleaning of machine oil and the like.

Next, in the air-permeable member for mold and die use of the embodiment of the present invention, machining with a ball end mill is carried out to obtain the requisite surface roughness. Machining conditions for the ball end mill are as follows: rpm: 3000-30000 rpm; feed speed: 1000-2000 mm/min; diameter: 0.5 to 10 mm; feed pitch increment: 0.1 mm, and amount of finishing cut: 0.1 mm.

Also, the surface roughness of the machining portion machined by ball end milling of the air-permeable member for mold and die use is 3 μm-20 μm, and preferably 3.2 μm-13.5 μm.

In addition, the air permeability of the air-permeable member for mold and die use obtained by ball end mill machining is 100-2000 cm$^3$/cm$^2$·sec.

When EDM is performed in order to prevent the air-permeable member for mold and die use from clogging, surface roughness is coarsened, leading to the problem of increased mold ejecting resistance in injection molding when releasing products. However, machining of the air-permeable member for mold and die use of the embodiment of the present invention was carried out by a ball end mill under the above-described conditions, therefore surface roughness was 20 μm or less, mold ejecting resistance at the time of resin injection molding was reduced, and dimensional accuracy in precision injection molded parts was easily attained. This is therefore applicable even to areas previously considered difficult, such as rib shapes and the like.

The invention claimed is:

1. An air-permeable member for mold and die use obtained by EDM, etching, or machining of the mold and die metallic material, the mold and die metallic material being made by forming a mixed material containing stainless steel fibers with an equivalent diameter of 30-300 μm and a length of 0.4-5.0 mm, and stainless steel powder, heat sintering a green body of the mixed material, and heating the sintered body thus obtained in a nitrogen atmosphere and nitrided, the air-permeable member comprising:
    open pores whose average open pore diameter is 3-50 μm;
    a plurality of drilled conducting holes each formed straight through an interior of the air-permeable member and each having inlet and outlet openings opened, respectively, in opposite sides of the air-permeable member, wherein the conducting holes have a diameter of 5-20 mm;
    a hardening agent added epoxy resin having a viscosity of 200 mPa·s-20000 mPa·s and applied over inner surfaces of the conducting holes; and
    a connecting pipe configured to connect the outlet of a conducting hole to the inlet of an adjacent conducting hole so that cooling water can flow through the conducting holes and the connecting pipes to maintain the air-permeable member at a fixed temperature,
    wherein the air-permeable member cleaned out by air blowing has an air permeability of 50 cm$^3$/cm$^2$·sec or greater.

2. The air-permeable member for mold and die use according to claim 1, wherein the stainless steel fibers and stainless steel powder are ferritic stainless.

3. The air-permeable member for mold and die use according to claim 2, wherein the nitrogen content resulting from nitriding is 0.3-1.2 wt. % per 100 wt. % stainless component.

4. The air-permeable member for mold and die use according to claim 3, wherein the mixed material further contains copper powder or copper-tin alloy powder.

5. The air-permeable member for mold and die use according to claim 4, wherein the mixed material contains 20-80 wt. % stainless steel fiber and 20-80 wt. % stainless steel powder as stainless component, as well as 1-10 wt. % copper powder or copper-tin alloy powder per 100 wt. % stainless component.

6. The air-permeable member for mold and die use according to claim 5, wherein porosity of the open pore is 15-35%.

7. The air-permeable member for mold and die use according to claim 6, wherein nitriding is carried out by holding the material in nitrogen gas or decomposed ammonia gas at 900-1050° C.

8. The air-permeable member for mold and die use according to claim 1, comprising a machined surface whose roughness is 3 μm-20 μm.

9. The air-permeable member for mold and die use according to claim 8, wherein the machined surface has a roughness of 3.2 μm-13.5 μm.

10. The air-permeable member for mold and die use according to claim 9, wherein the surface is machined by a ball end mill, and the ball end mill rotates at 3000-30000 rpm, at a feed speed of 1000-2000 mm/min.

11. A method for making an air-permeable member for mold and die use comprising the steps of:
   forming a mixed material containing stainless steel fibers with an equivalent diameter of 30-300 μm and a length of 0.4-5.0 mm and stainless steel powder to make a green body;
   heat sintering the green body of the mixed material to make a sintered body;
   heating the sintered body in a nitrogen atmosphere to make a mold and die metallic material having open pores whose average open pore diameter is 3-50 μm;
   processing the mold and die metallic material to make an air-permeable member for mold and die use so as to have a surface roughness of 3 μm-20 μm;
   air-blowing the air-permeable member to clean the open pores in the air-permeable member to provide the air-permeable member with an air permeability of 50 cm³/cm²·sec or greater;
   drilling the air-permeable member to form conducting holes inside the air-permeable member, wherein the conducting holes have a diameter of 5-20 mm; and
   applying a hardening agent added epoxy resin having a viscosity of 200-20000 mPa·s over inner surfaces of the conducting holes to seal the open bores open in the conducting holes.

12. The method according to claim 11, wherein processing the mold and die metallic material comprise one of performing EDM on the mold and die metallic material, etching the mold and die metallic material and machining the mold and die metallic material.

13. The method according to claim 12, wherein machining the mold and die metallic material comprises using a ball end mill that rotates at 3000-30000 rpm and operates at a feed speed of 1000-2000 mm/min.

14. The method according to claim 11, wherein a ball end mill machines the air-permeable member to provide the air-permeable member with an air permeability of 100-2000 cm3/cm2·sec.

15. The method according to claim 11, wherein drilling the air-permeable member to form conducting holes comprises drilling the air-permeable member to form conducting holes so as to each have inlet and outlet openings opened, respectively, in opposite sides of the air-permeable member, the method further comprising connecting the outlet of a conducting hole to the inlet of an adjacent conducting hole.

* * * * *